US010333801B2

(12) United States Patent
Stickle

(10) Patent No.: US 10,333,801 B2
(45) Date of Patent: Jun. 25, 2019

(54) INVENTORY SERVICE FOR DISTRIBUTED INFRASTRUCTURE

(71) Applicant: Amazon Technologies, Inc., Reno, NV (US)

(72) Inventor: Thomas Charles Stickle, Saint James, NY (US)

(73) Assignee: Amazon Technologies, Inc., Seattle, WA (US)

(*) Notice: Subject to any disclaimer, the term of this patent is extended or adjusted under 35 U.S.C. 154(b) by 269 days.

(21) Appl. No.: 13/827,693

(22) Filed: Mar. 14, 2013

(65) Prior Publication Data
US 2014/0280872 A1  Sep. 18, 2014

(51) Int. Cl.
*H04L 12/24* (2006.01)
*H04L 29/08* (2006.01)
*H04L 12/26* (2006.01)

(52) U.S. Cl.
CPC ........ *H04L 41/5058* (2013.01); *H04L 43/045* (2013.01); *H04L 67/16* (2013.01); *H04L 67/22* (2013.01)

(58) Field of Classification Search
CPC .................. H04L 12/2602; H04L 41/22; H04L 29/08072; H04L 29/06; H04L 43/00
USPC ........................................................ 709/224
See application file for complete search history.

(56) References Cited

U.S. PATENT DOCUMENTS

| 8,839,222 B1* | 9/2014 | Brandwine | G06F 11/3668 717/168 |
| 9,645,899 B1* | 5/2017 | Felstaine | G06F 11/2002 |
| 10,027,569 B1* | 7/2018 | Ur | H04L 43/50 |
| 2002/0026631 A1* | 2/2002 | Barritz | G06F 11/3419 717/127 |
| 2004/0128585 A1* | 7/2004 | Hind | G06F 11/366 714/38.14 |
| 2006/0107256 A1* | 5/2006 | Zarenin | G06F 21/105 717/127 |
| 2007/0061347 A1* | 3/2007 | Burnley | G06F 11/3419 |
| 2011/0173251 A1* | 7/2011 | Sandhu | G06F 8/61 709/203 |
| 2011/0295727 A1* | 12/2011 | Ferris | G06F 11/34 705/34 |

(Continued)

FOREIGN PATENT DOCUMENTS

| JP | 2009217395 A | 9/2009 |
| JP | 2009217656 A | 9/2009 |
| WO | 2011018827 A1 | 2/2011 |

OTHER PUBLICATIONS

International Search Report dated Aug. 19, 2014 in co-pending PCT Application No. PCT/UC 14/26003 filed Mar. 13, 2014.

(Continued)

*Primary Examiner* — Philip J Chea
*Assistant Examiner* — Wuji Chen
(74) *Attorney, Agent, or Firm* — Thomas Horstemeyer, LLP

(57) ABSTRACT

Disclosed are various embodiments for an inventory application. Machine instances execute a monitoring service to determine the process names of applications executed in the machine instance. An inventory application identifies the applications executed on the machine instances as a function of data obtained from the monitoring services. Analytics reports can be generated from data embodying the identified applications.

21 Claims, 10 Drawing Sheets

(56) References Cited

U.S. PATENT DOCUMENTS

| | | | | |
|---|---|---|---|---|
| 2011/0295998 A1* | 12/2011 | Ferris | .................... | G06F 9/5072 709/224 |
| 2011/0296000 A1* | 12/2011 | Ferris | .................... | G06Q 10/00 709/224 |
| 2011/0296393 A1* | 12/2011 | Vidal | ...................... | G06F 8/453 717/171 |
| 2012/0011496 A1* | 1/2012 | Shimamura | ......... | G06F 9/44521 717/170 |
| 2012/0023226 A1* | 1/2012 | Petersen | ................ | H04W 4/18 709/224 |
| 2012/0036220 A1* | 2/2012 | Dare | ......................... | G06F 8/61 709/217 |
| 2012/0072576 A1* | 3/2012 | Yumerefendi | ...... | G06F 11/3476 709/224 |
| 2012/0174097 A1* | 7/2012 | Levin | .................... | G06F 9/5077 718/1 |
| 2012/0216244 A1 | 8/2012 | Kumar et al. | | |
| 2013/0179971 A1* | 7/2013 | Harrison | ................ | G06F 21/55 726/23 |
| 2014/0075013 A1* | 3/2014 | Agrawal | ............ | G06F 11/3495 709/224 |
| 2014/0201374 A1* | 7/2014 | Ashwood-Smith | ..... | H04L 49/70 709/226 |
| 2015/0082308 A1* | 3/2015 | Kiess | .................... | G06F 9/5072 718/1 |
| 2015/0381465 A1* | 12/2015 | Narayanan | ............ | H04L 43/062 709/224 |
| 2016/0028648 A1* | 1/2016 | Wohlert | ................. | H04L 67/18 709/226 |

OTHER PUBLICATIONS

Supplementary European Search Report for EP 14 77 2622 dated Sep. 12, 2016.
Notice of Reasons for Rejection (Office Action) for JP 2016-502022 dated Nov. 25, 2016.
Chinese Office Action for 201480014824.2 dated Dec. 20, 2017.
Chinese Office Action dated Mar. 27, 2017 for Application No. 201480014824.2.
Canadian Office Action dated Sep. 1, 2017 for Application No. 2014/026003.
EPO Communication for 14772622.8 dated Sep. 12, 2018.

* cited by examiner

INVENTORY SERVICE FOR DISTRIBUTED INFRASTRUCTURE

BACKGROUND

A distributed computing infrastructure allows for a variety of services and applications to be executed in machine instances. It would be beneficial to be able to determine what services and applications are currently implemented in the machine instances.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Distributed computing infrastructures allow for customers to implement machine instances simulating the operation of a computing device. The customers are allowed to implement an operating system and application suite of their choice in the machine instance. Often, the distributed computing infrastructure is modeled using a split security model, where the customer has exclusive access to the root functionality of the machine instance, while the service provider has exclusive access to the infrastructure functionality. This prevents the service provider and customer from interfering with the operation of their respective services, and rests the responsibility for maintenance and configuration of the services in their respective administrators.

As the service provider does not have root access to the machine instances, it is difficult to determine what applications are being executed in the machine instances. Such information would be useful to independent software vendors to facilitate better marketing of their products. Such information would also be useful to the customers implementing the machine instances in order to inform them of software updates, best practice compliance, security vulnerabilities, or other information.

An inventory application executed separately from the machine instances communicates with a monitoring service executed in each of the machine instances. The monitoring application determines the names of processes executed in the respective machine instance. The executed applications are then identified using the process names. The version of the executed applications may also be determined from the process names. The monitoring service may also communicate with an instance metadata service to obtain metadata for communication to the inventory application. The identification of the executed applications and metadata is then communicated by the monitoring service to the inventory application, which stores the information for generating analytics or for another purpose.

In the following discussion, a general description of the system and its components is provided, followed by a discussion of the operation of the same.

Figure 1:
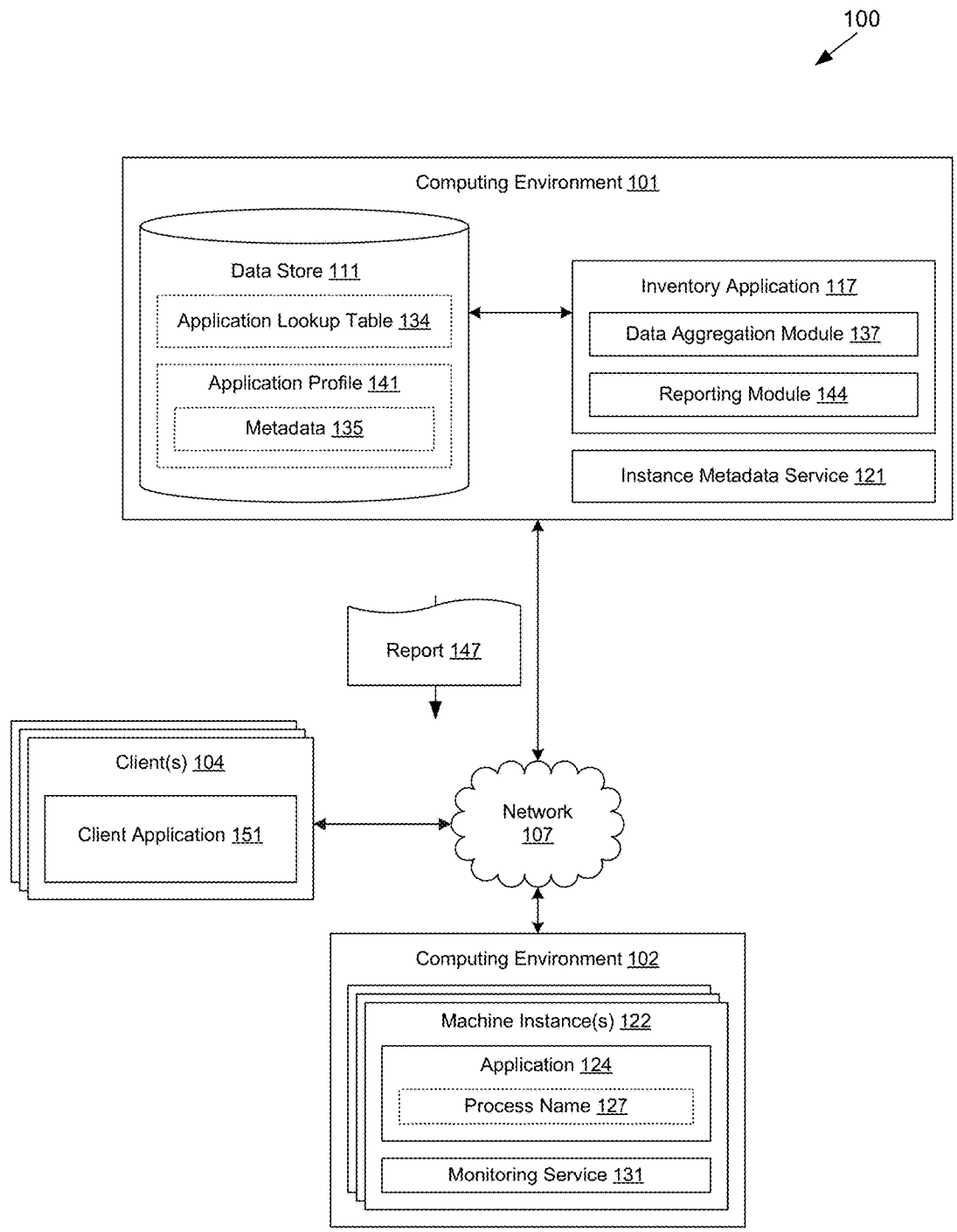
FIG. 1 is a drawing of a networked environment according to various embodiments of the present disclosure.

With reference to FIG. 1, shown is a networked environment 100 according to various embodiments. The networked environment 100 includes a computing environment 101, a computing environment 102, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environments 101 or 102 may comprise, for example, a server computer or any other system providing computing capability. Alternatively, the computing environments 101 or 102 may employ a plurality of computing devices that may be employed that are arranged, for example, in one or more server banks or computer banks or other arrangements. Such computing devices may be located in a single installation or may be distributed among many different geographical locations. For example, the computing environments 101 or 102 may include a plurality of computing devices that together may comprise a cloud computing resource, a grid computing resource, and/or any other distributed computing arrangement. In some cases, the computing environments 101 or 102 may correspond to an elastic computing resource where the allotted capacity of processing, network, storage, or other computing-related resources may vary over time. Although the computing environments 101 and 102 are shown as distinct computing environments 101 and 102, in some embodiments the computing environments 101 and 102 may be implemented as a combined computing environment 101 or 102.

Various applications and/or other functionality may be executed in the computing environments 101 or 102 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include an inventory application 117, an instance metadata service 121, and other applications, services, processes, systems, engines, or functionality not discussed in detail herein. The components executed on the computing environment 102, for example, include machine instances 122, and other applications, services, processes, systems, engines, or functionality not discussed in detail herein. The machine instances 122 comprise a virtualized instance of an operating system to facilitate the execution of one or more applications 124. Although machine instances 122 are discussed as virtualized instances of an operating system executed within a computing device, it is understood that a dedicated execution of an operating system by a computing device may also be used in place of a machine instance 122.

Each of the applications 124 is associated with a process name 127 when executed in the operating system of the machine instances 122. The process name 127 may comprise an alphanumeric string such as a process name, a numeric identifier, or some other unique identifier as can be appreciated.

Also executed in the machine instances 122 is a monitoring service 131 to determine the process names 127 of the applications 124 currently being executed in the corresponding machine instance 122. The monitoring service 131 may be manually installed by a client 104 associated with a machine instance 122, automatically included in a newly initialized machine instance 122, or installed by another approach.

In some embodiments, determining the process names 127 of the applications 124 currently being executed in the corresponding machine instance 122 may comprise communicating with a task manager executed in the machine instance 122. In other embodiments, this may comprise executing an application program interface (API) call implemented in the operating system of the machine instance 122. Determining the process names 127 of the applications 124 currently being executed in the corresponding machine instance 122.

In some embodiments, the monitoring applications 124 may identify the executed application 124 corresponding to one of the process names 127 by determining a vendor, name, version, or other information associated with the application 124. In some embodiments, this may comprise communicating with a web service or API executed in the computing environment 101 which has access to an application lookup table 134 defining relationships between process names 127 and applications 124. In other embodiments, this may comprise accessing an application lookup table 134 or other data locally embodied in the machine instance 122. Identifying the applications 124 may also be performed by another approach.

In some embodiments, the monitoring service 131 communicates with an instance metadata service 121 to obtain metadata 135 associated with the respective machine instance 122. The instance metadata service 121 may expose a web service or API which facilitates obtaining the metadata 135 of the respective machine instance 122. The metadata 135 may comprise a unique machine instance 122 identifier, an identification of a customer account associated with the machine instance 122, or other data. The monitoring service 131 may then communicate process names 127, identifications of the applications 124, metadata 135, and potentially other data to the inventory application 117.

The inventory application 117 obtains data from monitoring services 131 executed in the machine instances 122 to facilitate the identification of applications 124 executed in respective ones of the machine instances 122. To this end, the inventory application 117 implements a data aggregation module 137 to facilitate the obtaining of process names 127, identifications of applications 124, metadata 135, and potentially other data. In some embodiments, this comprises exposing an API or web service accessible to the monitoring services 131 to facilitate communication of the process names 127, identifications of applications 124, metadata 135, and potentially other data. Obtaining the data to facilitate the identification of the applications 124 may also be performed by another approach.

In embodiments in which the monitoring services 131 do not identify the applications 124 executed in the respective machine instance 122, the inventory application 117 may identify the applications 124 as a function of process names 127, metadata 135, or other data obtained from the monitoring service 131 by an approach as described above with respect to the monitoring service 131. For example, this may comprise referencing an application lookup table 134, or another approach.

Additionally, in embodiments in which the monitoring services 131 do not communicate with the instance metadata service 121 to obtain metadata 135 for the respective machine instance 122, the inventory application 117 may communicate with the instance metadata service 121 to obtain the relevant metadata 135 by an approach described above with respect to the monitoring service 131.

After obtaining or generating identifications of the applications 124 executed in the respective one of the machine instances 122, the data aggregation module 137 may then store an application profile 141 with respect to the machine instance 122. The application profile 141 embodies data indicating which applications 124 are being executed in a particular machine instance 122. The application profile 141 may comprise process names 127, identifications of applications 124, metadata 135 such as a unique identifier corresponding to the machine instance 122 or an account identifier, and potentially other data.

The inventory application 117 may also implement a reporting module 144 to generate reports 147 as a function of the stored application profiles 141. For example, the reporting module 144 may calculate a usage rate, adoption rate, installation rate, or other aggregate data with respect to a particular application 124, a vendor of a group of applications 124, or other data. Additionally, the reports 147 may also comprise data associated with a use of a particular application 124 with respect to competing applications 124. Data embodied in the reports 147 may be aggregated with respect to one or more particular applications 124, application 124 vendors, machine instances 122, customers of machine instances 122, data center regions, or other reference points. The reports 147 may also embody other data derived from the application profiles 141 as can be appreciated.

The reporting module 144 may also compare the obtained application profiles 141 to a security policy, best practice policy, or other guideline for application 124 implementation. For example, the reporting module 144 may determine if a machine instance 122 is executing a version of an application 124 with a known security vulnerability as disclosed in a security policy. The reporting module 144 may then communicate a notification to a customer associated with the machine instance 122 indicating the vulnerability. The reporting module 144 may also perform other functions with respect to the application profiles 141.

The data stored in the data store 111 includes, for example, an application lookup table 134, application profiles 141, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 151 and/or other applications. The client application 151 may be executed in a client 104, for example, to access network content served up by the computing environment 101 and/or other servers, such as a report 147. To this end, the client application 151 may comprise, for example, a browser, a dedicated application, etc. The client 104 may be configured to execute applications beyond the client application 151 such as, for example, email applications, social networking applications, word processors, spreadsheets, and/or other applications.

Next, a general description of the operation of the various components of the networked environment 100 is provided. To begin, one or more machine instances 122 are executed in the computing environment 102. Each of the machine instances 122 is executing at least one application 124 and a monitoring service 131. The monitoring service 131 determines process names 127 for the applications 124 executed in the respective machine instance 122. In some embodiments, this comprises communicating with a task manager or other application 124 executed in the machine instance 122. In other embodiments, this comprises calling an API implemented in the operating system of the machine instance 122. Determining the process names 127 may also be performed by another approach. The process names 127 are then communicated to the data aggregation module 137 of the inventory application 117 by an API, web service, or by another approach.

In some embodiments, the monitoring service 131 may identify an application 124 associated with a process name 127 by querying an application lookup table 134 relating a process name 127 to an application 124 identification. This may comprise calling an API or web service accessible to the machine instance 122, querying a locally maintained application lookup table 134, or another approach. The identifications of the applications 124 may then be communicated to the data aggregation module 137 by an API, web service, or by another approach.

In some embodiments, the monitoring service 131 may query an instance metadata service 121 executed in the computing environment 101 to obtain metadata 135 for the corresponding machine instance 122. In some embodiments, the instance metadata service 121 may expose a web service or API accessible to the monitoring service 131 to facilitate obtaining the metadata 135. Metadata 135 may also be obtained by another approach. The metadata 135 may then be communicated to the data aggregation module 137 of the inventory application 117 by an API, web service, or by another approach.

The communication of process names 127, identifications of applications 124, or metadata 135 by the monitoring service 131 may be performed as a function of user or customer preferences defined with respect to a machine instance 122 or a customer account associated with a machine instance 122. For example, the user preferences may define a subset of applications 124 for which process names 127, identifications of applications 124, metadata 135, or other data may or may not be communicated to the data aggregation module 137.

Next, the data aggregation module 137 identifies the applications 124 executed in the machine instances 122. In some embodiments, this comprises obtaining identifications embodied in data communicated by a monitoring service 131. In other embodiment, this comprises obtaining process names 127 from the monitoring services 131 and querying an application lookup table 134. Identifying the applications 124 executed in the machine instances 122 may also be performed by another approach.

In some embodiments, the data aggregation module 137 may also generate metadata 135 associated with a respective machine instance 122. In some embodiments, this may comprise obtaining the metadata 135 the monitoring service 131 of the corresponding machine instance 122. In other embodiments, this may comprise communicating with an instance metadata service 121 to obtain the metadata 135 for a defined machine instance 122. The metadata 135 may also be generated by another approach. The data aggregation module 137 may then store the process names 127, identifications of applications 124, metadata 135, or potentially other data as an application profile 141 associated with a machine instance 122.

The reporting module 144 may then generate a report 147 as a function of the application profiles 141 for communication to a client 104. The report 147 may be generated responsive to a request obtained from a client 104, generated at a predefined interval, or generated responsive to some other condition. The report 147 may be communicated to the client 104 as an email attachment, encoded in a network page rendered by a browser client application 151, encoded as data for rendering by a dedicated client application 151, or by another approach.

For example, the reporting module 144 may generate a report 147 for communication to a client 104 associated with a vendor of applications 124 embodying usage statistics for their applications 124 or competing applications. As another example, the reporting module 144 may generate and communicate a report 147 to a client 104 associated with a machine instance 122 customer embodying a compliance with respect to a security policy or best practice policy and the machine instance 122. Reports 147 may also be generated and communicated by another approach.

FIGS. 2A-2D represent various levels of detail for a data center architecture 200 according to various embodiments. The various components of the data center architecture 200 described in FIG. 2A-2D and their various subcomponents as will be described are representative an example implementation of a computing environment 101 (FIG. 1) to facilitate the execution of machine instances 122 (FIG. 1).

Figure 2A:
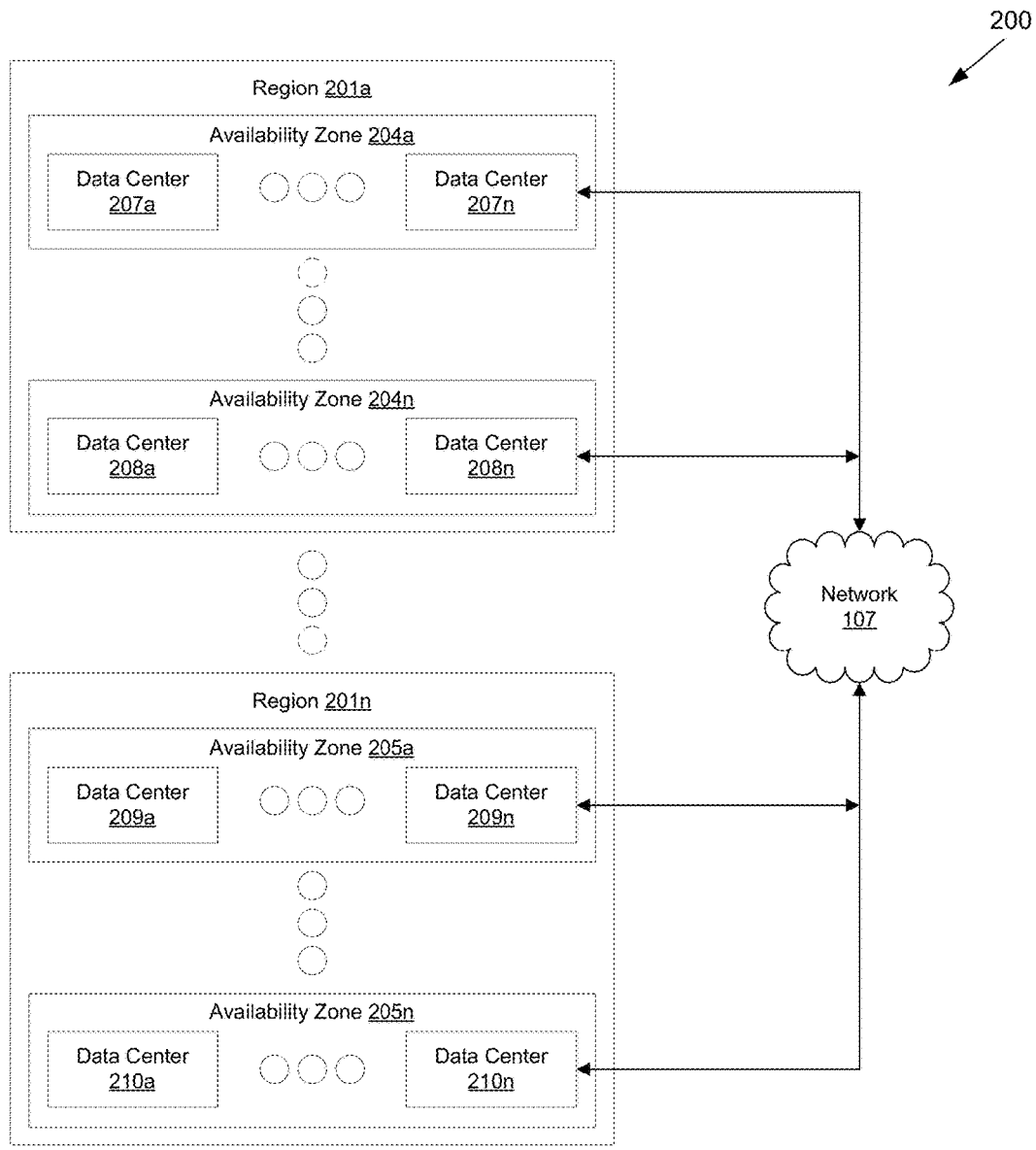
FIG. 2A is a drawing of an example region-level data center architecture according to various embodiments of the present disclosure.

FIG. 2A represents a region-level view of an example data center architecture 200 according to various embodiments. Regions 201a-n are a plurality of logical groupings comprising a plurality of availability zones 204a-n and 205a-n. Regions 201a-n may be grouped as a function of geography, national boundaries, a logical or graphical topology, or some other approach. For example, regions 201a-n may be grouped by geographical areas of the United States, such as the Southeast, the Midwest, the Northeast, or other geographical areas. Other approaches may also be used to define regions 201a-n.

Each region 201a-n comprises one or more availability zones 204a-n or 205a-n. Each of the availability zones 204a-n or 205a-n are logical groupings comprising one or more data centers 207a-n, 208a-n, 209a-n, and 210a-n. Availability zones 204a-n or 205a-n are defined to be insulated from failures in other availability zones 204a-n or 205a-n, and to optimize latency costs associated with connectivity to other availability zones 204a-n or 205a-n in the same region 201a-n. For example, distinct availability zones 204a-n or 205a-n may comprise distinct networks, power circuits, generators, or other components. Additionally, in some embodiments, a single data center 207a-n, 208a-n, 209a-n, or 210a-n may comprise multiple availability zones 204a-n or 205a-n. The regions 201a-n are in data communication with each other through a network 107 (FIG. 1).

Figure 2B:
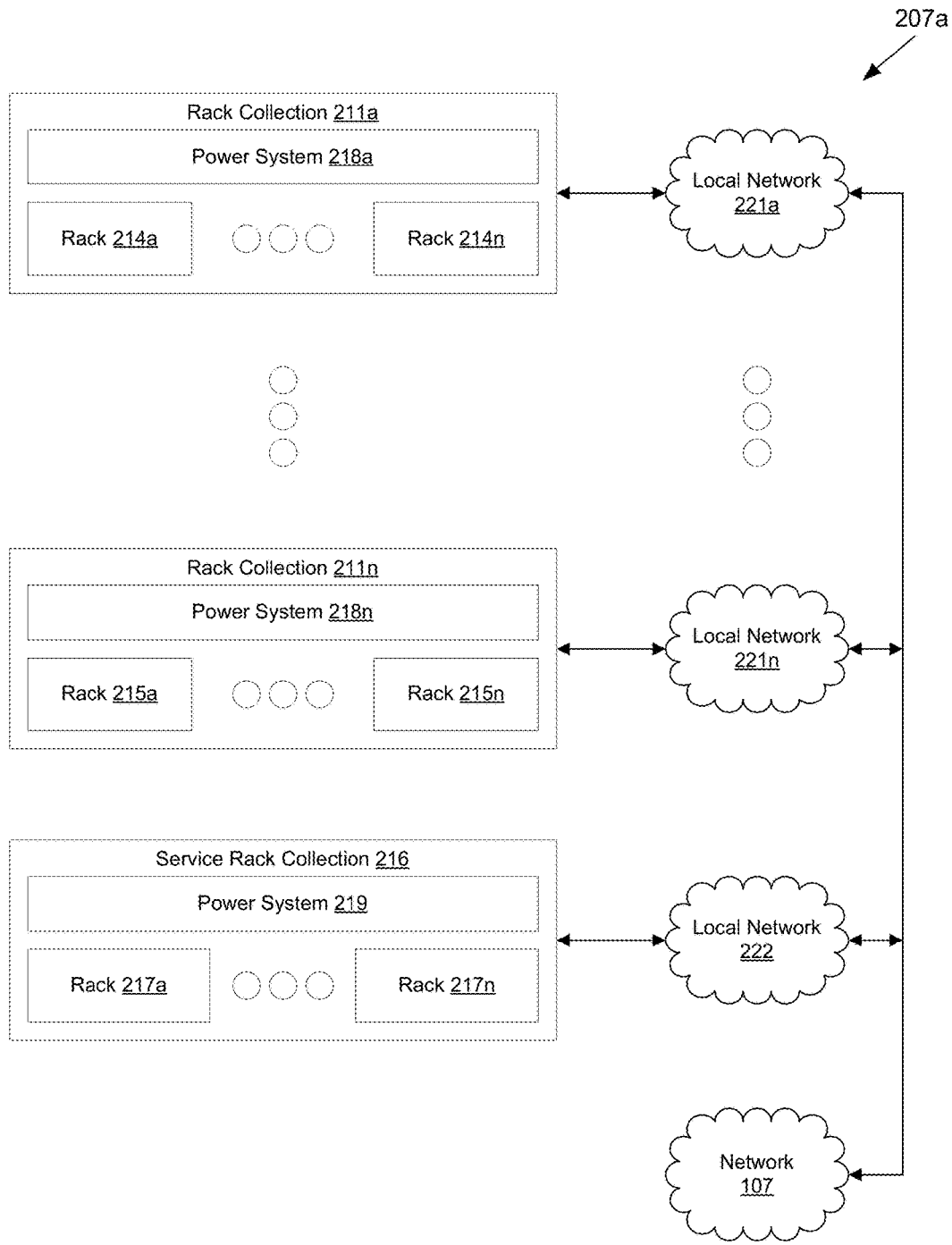
FIG. 2B is a drawing of an example data center-level data center architecture according to various embodiments of the present disclosure.

FIG. 2B depicts a data center-level view of an example data center architecture 200. The data center-level view may be representative of an architecture implemented in data center 207a-n, 208a-n, 209a-n, or 210a-n. Data center 207a comprises at least one rack collection 211a-n, and each rack collection 211a-n comprises a corresponding at least one rack 214a-n or 215a-n. The data center 207a may also comprise at least one service rack collection 216 comprising racks 217a-n to facilitate the implementation of machine instances 122 (FIG. 1).

Each rack collection 211a-n or 216 also comprises at least one power system 217a-n or 219 to which the corresponding grouping or racks 214a-n, 215a-n, or 217a-n are connected. Power systems 217a-n or 219 may comprise cabling, switches, batteries, uninterrupted power supplies, generators, or other components implemented to facilitate the powering of racks 214a-n, 215a-n, or 217a-n.

Each rack collection 211a-n or 216 is coupled to a local network 221a-n or 222. The local networks 221a-n or 222 are implemented to facilitate data communications between the components of the corresponding rack collection 211a-n. The local networks 221a-n or 222 may also facilitate data communications between the corresponding rack collection 211a-n or 216 and the network 107.

Figure 2C:
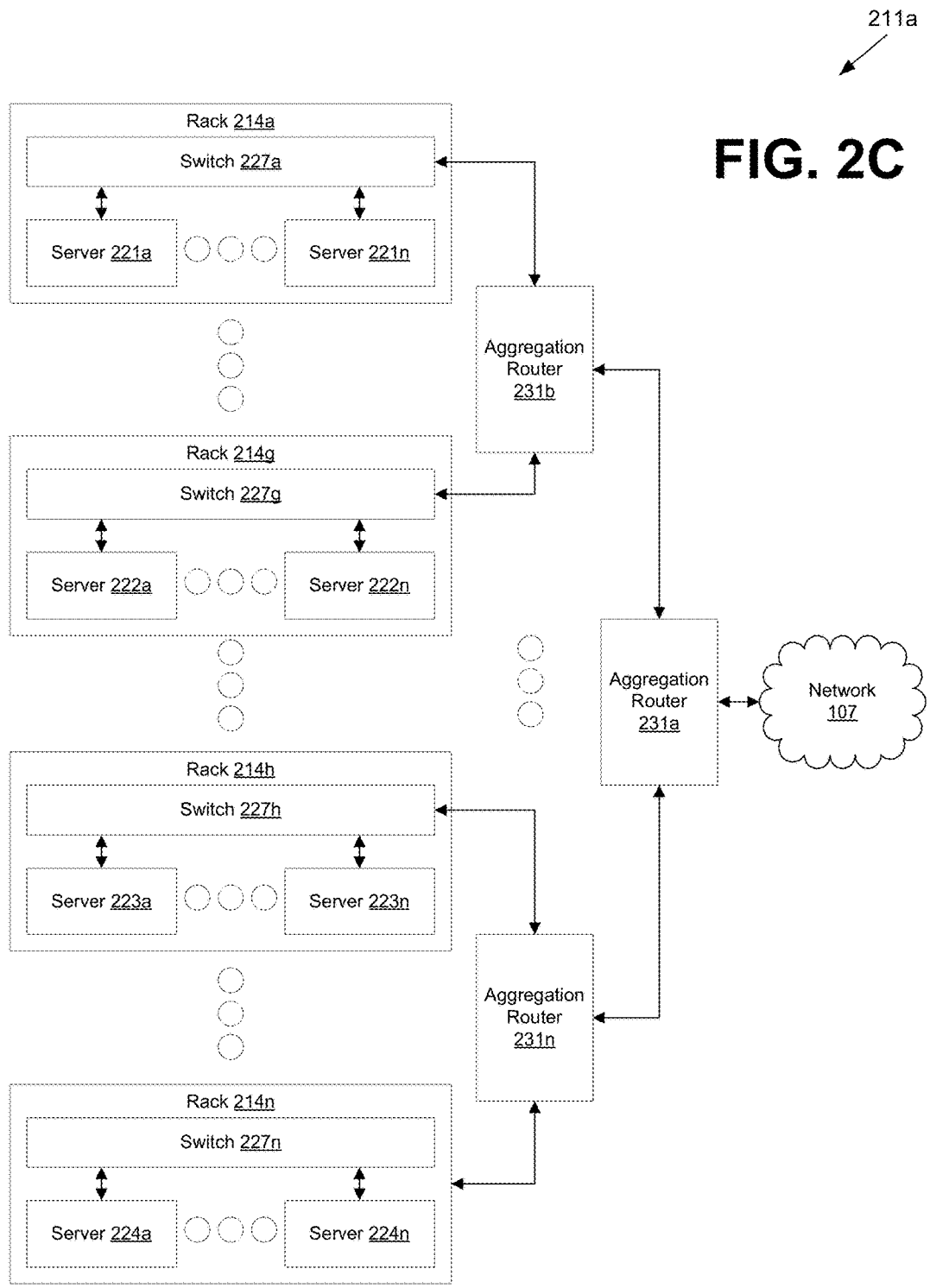
FIG. 2C is a drawing of an example rack-level data center architecture according to various embodiments of the present disclosure.

FIG. 2C depicts a rack collection-level implementation of a data center architecture 200 according to various embodiments. The rack collection-level implementation may be representative of a rack collection 211a-n or 216. For example, the rack collection 211a comprises a plurality of racks 214a-n, subdivided into subsets of racks 214a-g and racks 214h-n. Each rack 214a-n comprises a plurality of servers 221a-n, 222a-n, 223a-n, or 224a-n and potentially other functionality. Each server 221a-n, 222a-n, 223a-n, or 224a-n may comprise shared or distinct hardware configurations. Each of the racks 214a-n also comprises at least one switch 227a-n to which the corresponding servers 221a-n, 222a-n, 223a-n, or 224a-n. The rack collection 221a also comprises a hierarchy of aggregation routers 231a-n. Although FIG. 2C depicts a two-level hierarchy of aggregation routers 231a-n, it is understood that one or more levels of aggregation routers 231a-n may be implemented. The highest level of the aggregation routers 231a-n are in communication with an external network 107 (FIG. 1).

The aggregation routers 231a-n facilitate the routing of network communications to the servers 221a-n, 222a-n, 223a-n, or 224a-n. To this end, each of the switches 227a-n are in data communication with the aggregation routers 231a-n.

Figure 2D:
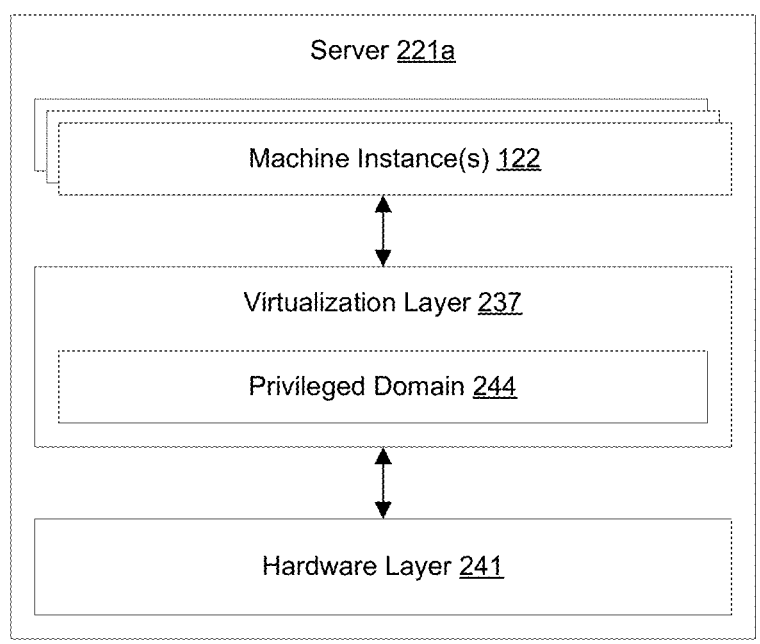
FIG. 2D is a drawing of an example server-level data center architecture according to various embodiments of the present disclosure.

FIG. 2D depicts a server 221a as implemented in a data center architecture 200. Although FIG. 2D is drawn to server 221a, it is understood that FIG. 2D may be representative of any server 221a-n, 222a-n, 223a-n, or 224a-n.

Executed on server 221a are one or more machine instances 122. The machine instance 234 comprises a virtualized instance of an operating system to facilitate the execution of services, applications, or other functionality. Each machine instance 122 communicates with a virtualization layer 237. The virtualization layer 227 controls access to the hardware layer 231 by each of the executed machine instances 234. The virtualization layer 237 may further comprised a privileged domain 244. The privileged domain 244 may comprise a machine instance 234 with distinct or higher-level user privileges with respect to the other executed machine instances 234 in order to facilitate interactions between machine instances 234, the hardware layer 241, or other components. The privileged domain 244 may also comprise access restrictions, limiting operation of the privileged domain 244 to an authorized subset of users such as a system administrator. The privileged domain 224 may facilitate the creation and management of machine instances 234.

The hardware layer 241 comprises various hardware components implemented to facilitate the operation of machine instances 234 and their associated executed functionality. The hardware layer 241 may comprise network interface cards, network routing components, processors, memories, storage devices, or other components.

Figure 3A:
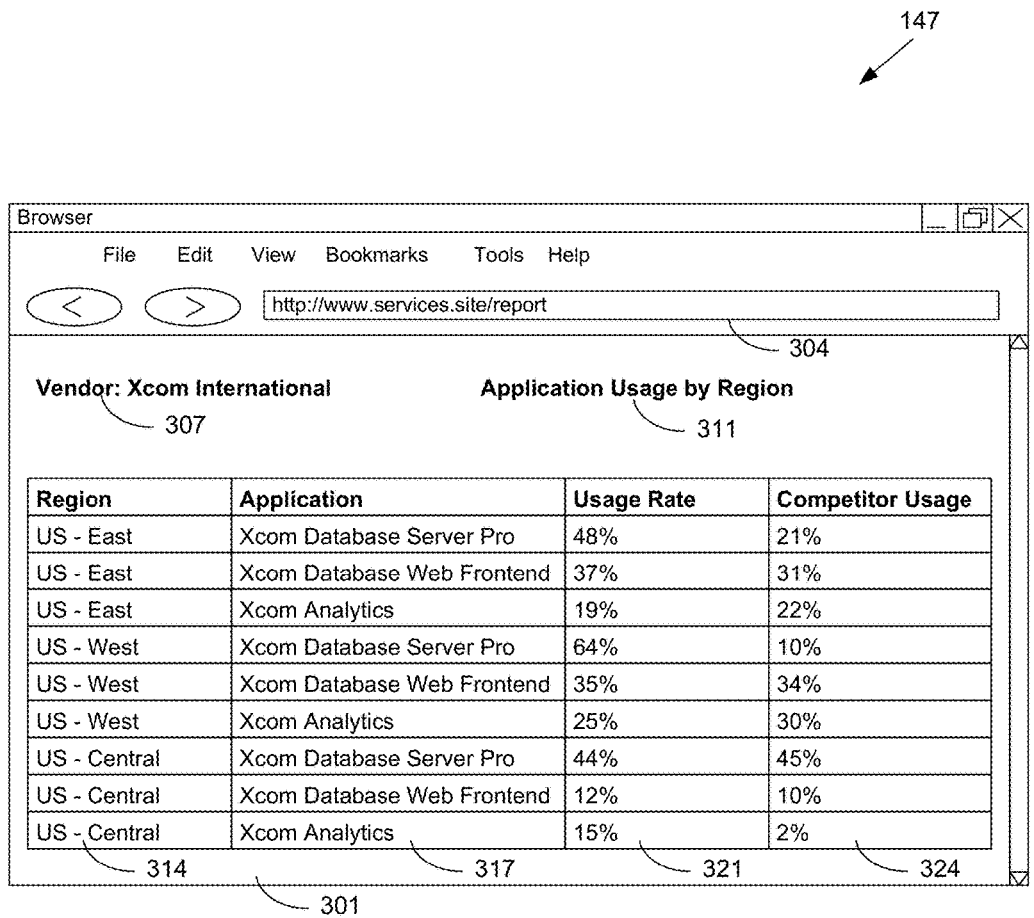
FIGS. 3A and 3B are drawings of an example of a user interface rendered by a client in the networked environment of FIG. 1 according to various embodiments of the present disclosure.

Referring next to FIG. 3A, shown is an example report 147 (FIG. 1) encoded by the reporting module 144 (FIG. 1) for communication to a client 104 (FIG. 1). In some embodiments, the user interface depicted in FIG. 3A comprises a network page encoded for rendering by a browser client application 151 (FIG. 1). In the alternative, the user interface may comprise data encoded for rendering by a dedicated client application 151.

Item 301 depicts a report 147 detailing the use of applications 124 for a particular vendor as implemented in machine instances 122 (FIG. 1), broken down by data center region and individual application 124. Item 304 is a uniform resource locator (URL) directed to a network page embodying the report 147. Item 307 is a text identifier corresponding to the name of the vendor with respect to which the report 147 was generated. Item 311 is a text identifier indicating the data embodied in the report 147.

Item 314 is a table column whose cells define a data center region to which the other cells in the row correspond. Item 317 is a table column whose cells define three different applications 124 sold by the vendor. Item 321 is a usage rate of the corresponding application 124 in the corresponding data center region. Item 324 is a usage rate of competing applications 124 in the corresponding data center region.

Figure 3B:
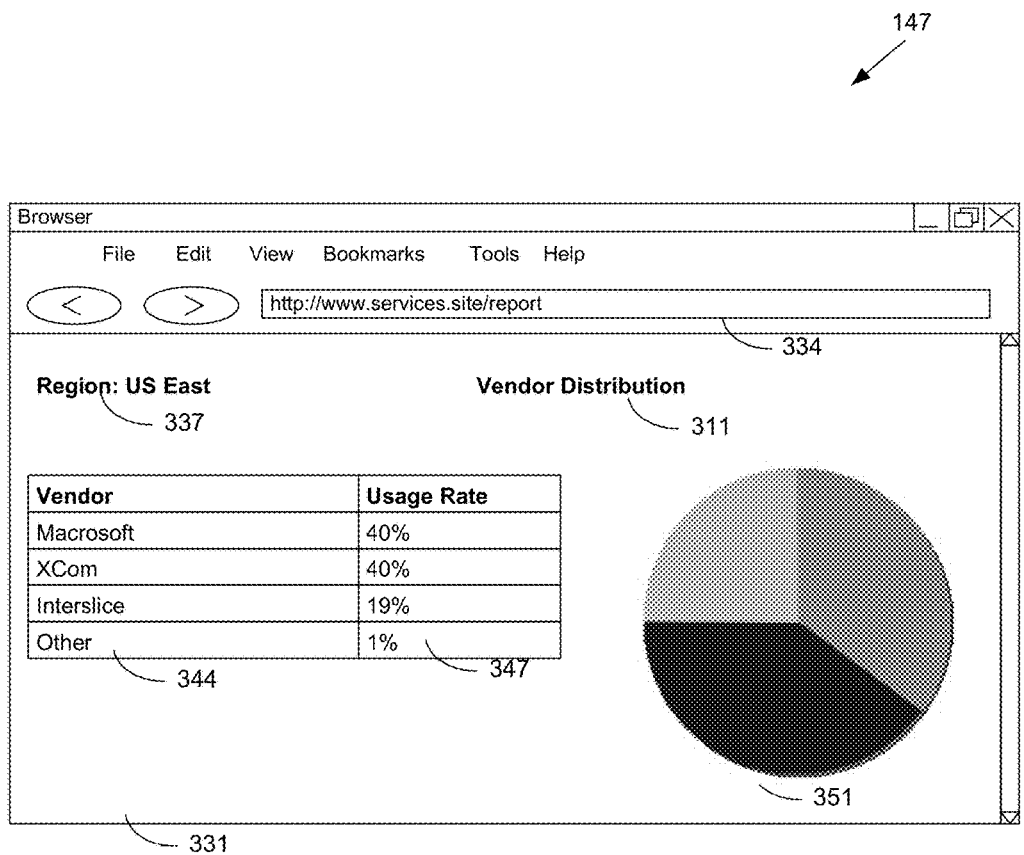

Turning now to FIG. 3B, shown is an example report 147 (FIG. 1) encoded by the reporting module 144 (FIG. 1) for communication to a client 104 (FIG. 1). In some embodiments, the user interface depicted in FIG. 3B comprises a network page encoded for rendering by a browser client application 151 (FIG. 1). In the alternative, the user interface may comprise data encoded for rendering by a dedicated client application 151.

Item 331 depicts a report 147 detailing the use of applications 124 as implemented in machine instances 122 (FIG. 1) for the US-East data center region, broken down by data center region and application 124 vendor. Item 334 is a uniform resource locator (URL) directed to a network page embodying the report 147. Item 337 is a text identifier corresponding to the name of the data center region with respect to which the report 147 was generated. Item 341 is a text identifier indicating the data embodied in the report 147.

Item 344 is a table column whose cells define a vendor to which the application 124 usage data corresponds. Item 347 is a table column whose cells embody application 124 usage in the US-East data center region for the corresponding vendor. Item 351 is a pie chart generated to embody the data described in items 344 and 347.

Figure 4:
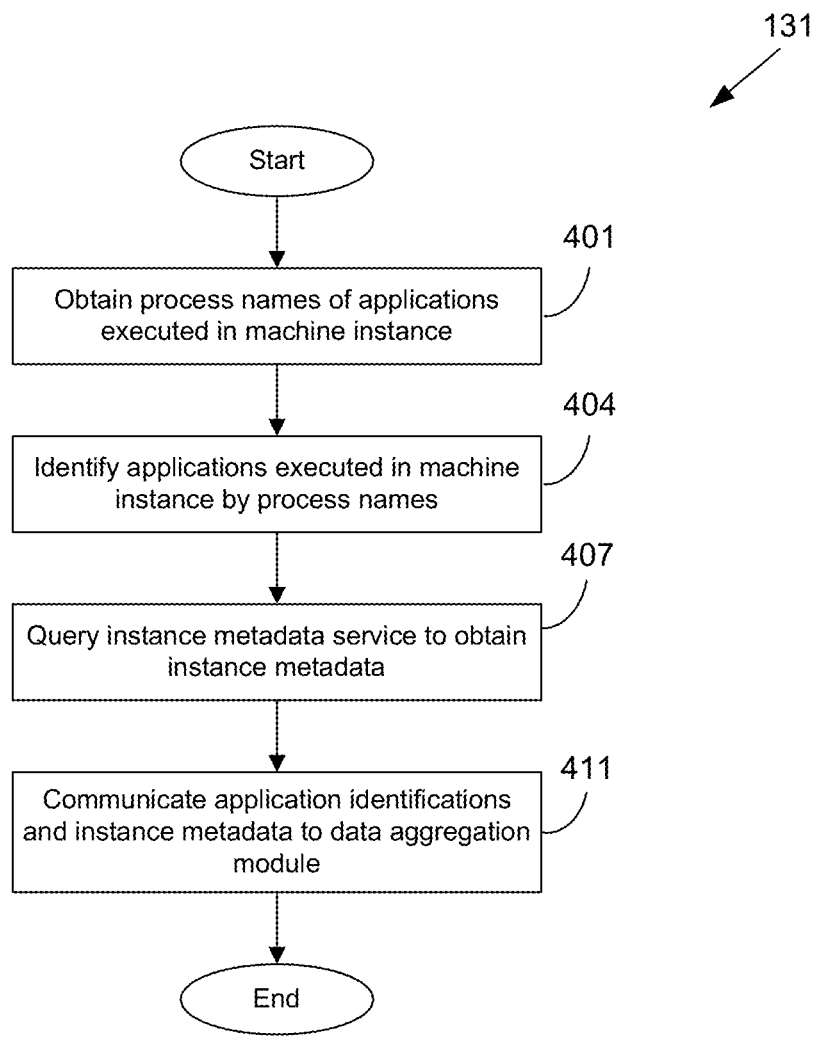
FIG. 4 is a flowchart illustrating one example of functionality implemented as portions of an inventory application executed in a computing environment in the networked environment of FIG. 1 according to various embodiments of the present disclosure.

Moving on to FIG. 4, shown is a flowchart that provides one example of the operation of a portion of the monitoring service 131 (FIG. 1) according to various embodiments. It is understood that the flowchart of FIG. 4 provides merely an example of the many different types of functional arrangements that may be employed to implement the operation of the portion of the monitoring service 131 as described herein. As an alternative, the flowchart of FIG. 4 may be viewed as depicting an example of steps of a method implemented in the computing environment 102 (FIG. 1) according to one or more embodiments.

Beginning with box 401, the monitoring service 131 obtains process names 127 (FIG. 1) corresponding to applications 124 (FIG. 1) being executed in a respective machine instance 122 (FIG. 1). Obtaining the process names 127 may comprise communicating with a task manager application 124 or service which monitors processes and applications 124 executed in an operating system. Obtaining the process names 127 may also comprise executing an application program interface call exposed by the operating system of the respective machine instance 141. Obtaining the process names 127 may also be obtained by another approach.

After obtaining the process names 127, the monitoring service 131 then identifies the applications 124 corresponding to each of the process names 127. In some embodiments, this comprises querying an application lookup table 134 relating process names 127 and applications 124. The application lookup table 134 may be locally accessible to the machine instance 122 or stored in the computing environment 101 or 102 and accessible through an API, web service, or other functionality. The monitoring service 131 may identify the application 124 as a function of the process names 127 other approaches.

Next, in box 407, the monitoring service 131 queries an instance metadata service 121 (FIG. 1) to obtain metadata 135 corresponding to the machine instance 122 in which the monitoring service 131 is executed. The metadata 135 may be obtained in response to a web service call, a network page request, an API call, or by another approach. After obtaining the metadata 135, in box 411, the monitoring service 131 then communicates the application 124 identifications and metadata 135 to the data aggregation module 137 (FIG. 1) of the inventory application 117 (FIG. 1). This may be performed as a function of a user preference associated with the respective machine instance 122 or customer account which defines a subset of the identifications or metadata 135 to be communicated. After communicating the identifications of the applications 124 and the metadata 135, the process ends.

Figure 5:
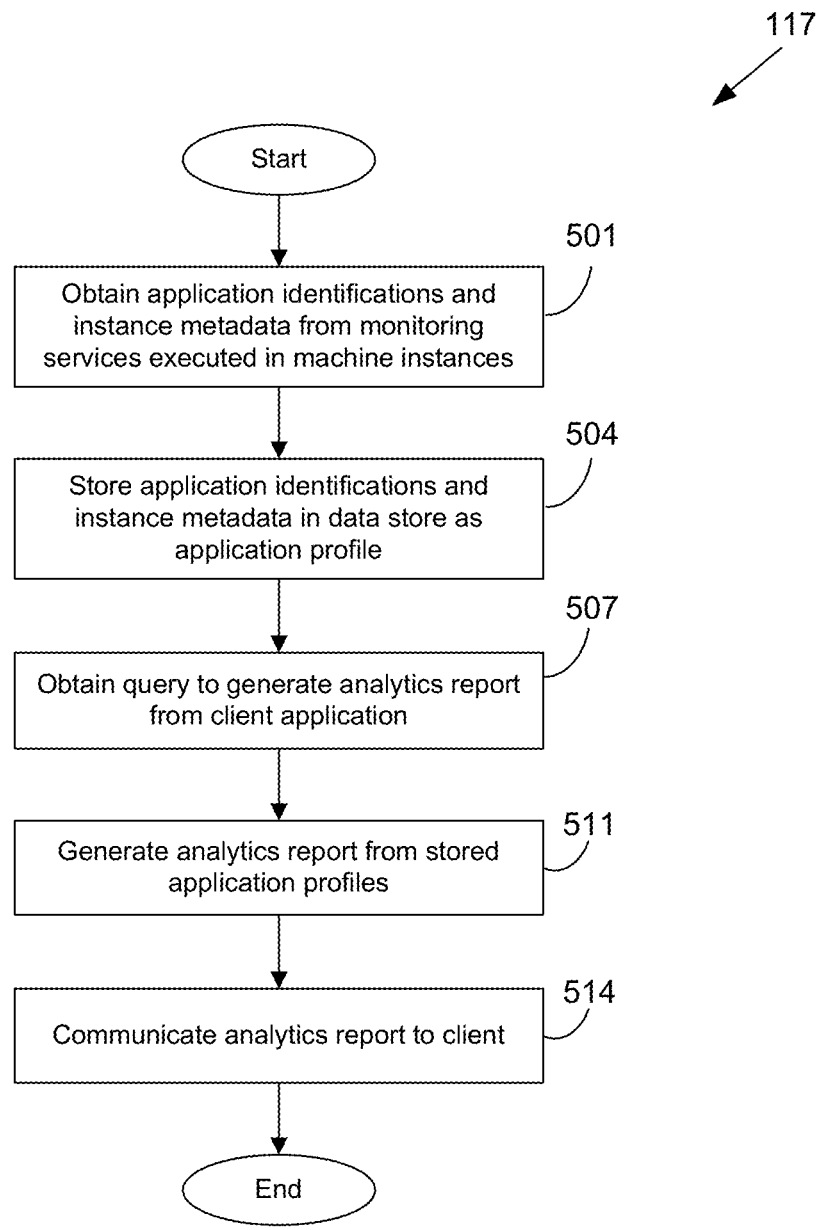
FIG. 5 is a flowchart illustrating one example of functionality implemented as portions of an inventory application executed in a computing environment in the networked environment of FIG. 1 according to various embodiments of the present disclosure.

Moving on to FIG. 5, shown is a flowchart that provides one example of the operation of a portion of the inventory application 117 (FIG. 1) according to various embodiments. It is understood that the flowchart of FIG. 5 provides merely an example of the many different types of functional arrangements that may be employed to implement the operation of the portion of the inventory application 117 as described herein. As an alternative, the flowchart of FIG. 5 may be viewed as depicting an example of steps of a method implemented in the computing environment 101 (FIG. 1) according to one or more embodiments.

Beginning with box 501, the data aggregation module 137 (FIG. 1) obtains application 124 identifications and machine instance 122 (FIG. 1) metadata 135 from monitoring services 131 (FIG. 1) executed in machine instances 122 operating the computing environment 102. Obtaining the application 124 identifications and metadata 135 may be facilitated by a web service, API, or other functionality exposed to the monitoring services 131, or obtained from a data store 111 (FIG. 1) accessible to both the monitoring services 131 and the data aggregation module 137. The application 124 identifications and metadata 135 may also be obtained by another approach.

Next, in box 504, the data aggregation module 137 stores the application 124 identifications and instance metadata 135 in a data store 111 as an application profile 141 (FIG. 1). This may comprise storing the application profile 141 as an entry in a relational database or other data structure embodying application 124 usage in machine instances 122. The application profile 141 may also be stored by another approach.

In box 507, the reporting module 144 (FIG. 1) of the inventory application 117 obtains a query from a client 104 (FIG. 1) to generate a report 147 (FIG. 1) as a function of stored application profiles 141. The report 147 may be generated as a function of a template or other rule set defined with respect to the client 104 requesting the report 147, an application 124 vendor, a machine instance 122 customer, or other party. The report 147 may comprise, for example, usage or adoption data for applications 124, compliance with a security policy or best practice policy, or other data.

After the report 147 has been generated, the report 147 is then communicated by the reporting module 144 to the client 104 via the network 107 (FIG. 1). The report 147 may be communicated as an encoded email attachment, a network page for rendering by a client application 151 (FIG. 1), stored in a data store 111 accessible to the client 104, or by another approach. The process ends after communicating the report 147.

Figure 6:
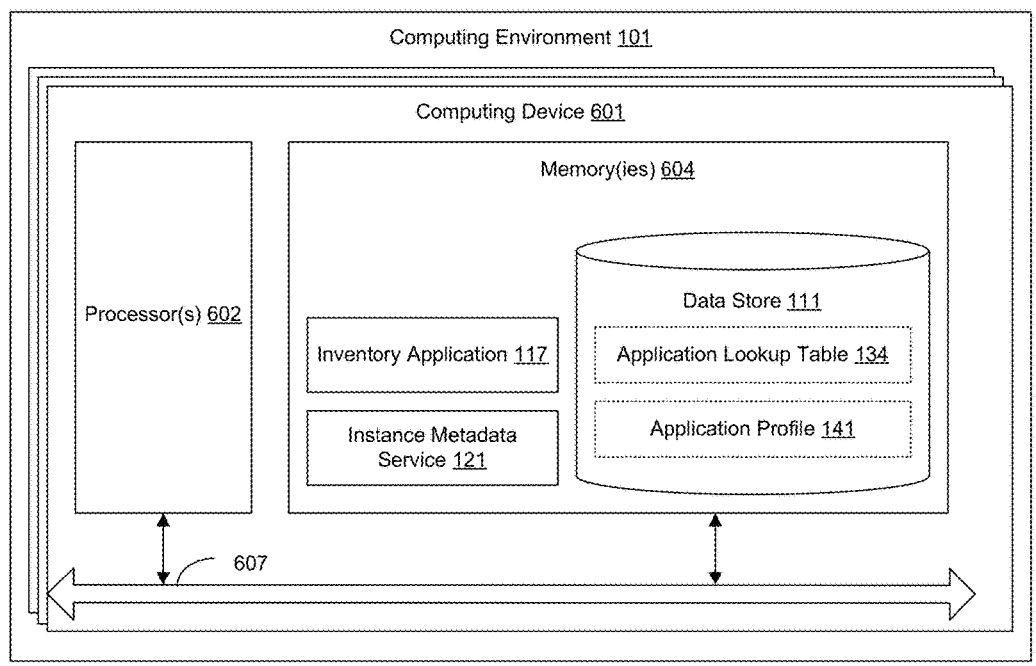
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 101 according to an embodiment of the present disclosure. The computing environment 101 includes one or more computing devices 601. Each computing device 601 includes at least one processor circuit, for example, having a processor 602 and a memory 604, both of which are coupled to a local interface 607. To this end, each computing device 601 may comprise, for example, at least one server computer or like device. The local interface 607 may comprise, for example, a data bus with an accompanying address/control bus or other bus structure as can be appreciated.

Stored in the memory 604 are both data and several components that are executable by the processor 602. In particular, stored in the memory 604 and executable by the processor 602 are an inventory application 117, an instance metadata service 121, and potentially other applications. Also stored in the memory 604 may be a data store 111 having an application lookup table 134 and application profile 141, and other data. In addition, an operating system may be stored in the memory 604 and executable by the processor 602.

It is understood that there may be other applications that are stored in the memory 604 and are executable by the processor 602 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 604 and are executable by the processor 602. In this respect, the term "executable" means a program file that is in a form that can ultimately be run by the processor 602. Examples of executable programs may be, for example, a compiled program that can be translated into machine code in a format that can be loaded into a random access portion of the memory 604 and run by the processor 602, source code that may be expressed in proper format such as object code that is capable of being loaded into a random access portion of the memory 604 and executed by the processor 602, or source code that may be interpreted by another executable program to generate instructions in a random access portion of the memory 604 to be executed by the processor 602, etc. An executable program may be stored in any portion or component of the memory 604 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 is defined herein as including both volatile and nonvolatile memory and data storage components. Volatile components are those that do not retain data values upon loss of power. Nonvolatile components are those that retain data upon a loss of power. Thus, the memory 604 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 may represent multiple processors 602 and/or multiple processor cores and the memory 604 may represent multiple memories 604 that operate in parallel processing circuits, respectively. In such a case, the local interface 607 may be an appropriate network that facilitates communication between any two of the multiple processors 602, between any processor 602 and any of the memories 604, or between any two of the memories 604, etc. The local interface 607 may comprise additional systems designed to coordinate this communication, including, for example, performing load balancing. The processor 602 may be of electrical or of some other available construction.

Although the inventory application 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the monitoring service 131 and inventory application 117, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 602 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the inventory application 117, that comprises software or code can be embodied in any non-transitory computer-readable medium for use by or in connection with an instruction execution system such as, for example, a processor 602 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying instructions executable in at least one computing device, the instructions, when executed by the at least one computing device, causing the at least one computing device to at least:
   execute a plurality of machine instances within a computing environment that implements a split security model, a service provider of the computing environment and an inventory service being excluded from root access to the machine instance based on the split security model, wherein a monitoring service is executed within a respective machine instance of the plurality of machine instances;
   generate, by the monitoring service executed in the respective machine instance, data that identifies a plurality of applications executed in the respective machine instance based at least in part on a plurality of process identifiers and an application table that relates process identifiers to applications, wherein a respective one of the plurality of process identifiers is associated with one of the plurality of applications;
   query, by the monitoring service executed within the respective machine instance, a metadata service executed external to the computing environment of the plurality of machine instances, to obtain instance metadata corresponding to the respective machine instance, wherein the instance metadata obtained from the metadata service comprises a unique identifier of the respective machine instance and a customer identifier;
   communicate, by the monitoring service, the instance metadata and data that identifies the plurality of applications to an inventory service that is executed external to the computing environment of the plurality of machine instances; and
   generate, by the inventory service, a network site that provides analytics as a function of the data that identifies the plurality of applications and the instance metadata.

2. The non-transitory computer-readable medium of claim 1, wherein the customer identifier comprises an account identifier.

3. The non-transitory computer-readable medium of claim 1, wherein an analytics report provided by the network site embodies an application usage with respect to a data center region or a customer account.

4. A system, comprising:
   a computing environment comprising at least one computing device configured to at least:
      execute a machine instance within the computing environment, wherein the computing environment implements a split security model, a service provider of the computing environment and an inventory service being excluded from root access to the machine instance based on the split security model;
      generate, by a monitoring service executed within the machine instance, data that identifies at least one application being executed in the machine instance based at least in part on at least one process identifier and an application table that relates process identifiers to applications, wherein the at least one process identifier is associated with one of the applications;
      query, by the monitoring service, a metadata service executed external to the computing environment, to obtain metadata corresponding to the machine instance, the metadata comprising a unique identifier of the machine instance and a customer identifier;
      transmit, by the monitoring service, the metadata obtained from the metadata service and the data that identifies the at least one application to the inventory service external to the machine instance; and
      generate, by the inventory service, a network site that provides analytics as a function of the data that identifies the at least one application and the metadata.

5. The system of claim 4, wherein the monitoring service is further configured to:
   determine at least one process name of at least one process corresponding to the at least one application executed in the machine instance.

6. The system of claim 4, wherein the data is generated as a function of a customer preference that is defined with respect to a customer account associated with the machine instance.

7. The system of claim 4, wherein the monitoring service accesses the application table through a web service.

8. The system of claim 4, wherein the inventory service is further configured to compare the data to at least one of a security policy or a best practices policy.

9. The system of claim 4, wherein the monitoring service is further configured to:
   determine a version number of the at least one application; and
   wherein the data further comprises the version number.

10. The system of claim 9, wherein the inventory service is further configured to:
    determine whether an update for the application is available as a function of the version number; and
    communicate a notification to a customer associated with the machine instance indicating the update.

11. The system of claim 4, wherein the inventory service is further configured to:
    add the data to a data aggregation; and
    generate an analytics report as a function of the data aggregation.

12. The system of claim 11, wherein the analytics report embodies an application usage distribution with respect to a distributed data center region, an account identifier, or an identifier of the machine instance.

13. The system of claim 4, wherein the metadata service executed external to the machine instance is configured to expose an application program interface enabling a web service call to return metadata associated with the machine instance.

14. A method, comprising:
    executing a plurality of machine instances within a computing environment comprising at least one computing device, wherein the computing environment implements a split security model, a service provider of the computing environment and an inventory service being excluded from root access to a respective machine instance of the plurality of machine instances based on the split security model;

generating, by a monitoring service executed in the respective machine instance, data that identifies a particular application executed in the respective machine instance based at least in part on a plurality of process identifiers and an application table that relates process identifiers to applications, wherein a particular process identifier is associated with the particular application;

querying, by the monitoring service executed in the respective machine instance, a metadata service executed external to the computing environment of the machine instance to obtain instance metadata associated with the respective machine instance, wherein the instance metadata obtained from the metadata service comprises a unique identifier of the respective machine instance and a customer identifier;

communicating, by the monitoring service, the instance metadata and the data that identifies the particular application to the inventory service executed external to the machine instance; and generating, by the inventory service, a network site that provides analytics as a function of the data that identifies the particular application and the instance metadata.

15. The method of claim 14, further comprising:

adding, in the at least one computing device, the data that identifies the particular application to an identification aggregation by the inventory service; and generating, in the at least one computing device, by the inventory service, an analytics report as a function of the identification aggregation.

16. The method of claim 14, wherein the method further comprises comparing, in the at least one computing device, the data that identifies the particular application to at least one of a security policy or a best practice policy.

17. The method of claim 14, wherein the metadata service enables a web service call to obtain the instance metadata associated with the respective machine instance.

18. The method of claim 17, wherein the instance metadata comprises at least one of a unique identifier of the respective machine instance or an account identifier associated with the machine instance.

19. The method of claim 16, wherein a customer preference defines that the particular application is permitted to be included in the data that identifies the particular application.

20. The method of claim 14, further comprising generating, in the at least one computing device, by the inventory service, an analytics report comprising a usage rate for the particular application in a particular region associated with the respective machine instance.

21. The method of claim 14, wherein the metadata service is configured to expose an application program interface that returns metadata associated with the respective machine instance.

* * * * *